(12) United States Patent
Schmidt

(10) Patent No.: US 8,847,558 B2
(45) Date of Patent: Sep. 30, 2014

(54) METHOD AND DEVICE FOR OPERATING A GENERATOR IN A RECUPERATION SYSTEM OF A MOTOR VEHICLE

(75) Inventor: Matthias Schmidt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/821,164

(22) PCT Filed: Aug. 18, 2011

(86) PCT No.: PCT/EP2011/064230
§ 371 (c)(1),
(2), (4) Date: May 16, 2013

(87) PCT Pub. No.: WO2012/034818
PCT Pub. Date: Mar. 22, 2012

(65) Prior Publication Data
US 2013/0221935 A1    Aug. 29, 2013

(30) Foreign Application Priority Data
Sep. 16, 2010   (DE) .......................... 10 2010 040 863

(51) Int. Cl.
*H02P 11/00*   (2006.01)
(52) U.S. Cl.
USPC .............................................. 322/23; 322/25
(58) Field of Classification Search
USPC ......................................... 322/22, 23, 24, 25
See application file for complete search history.

(56) References Cited

U.S. PATENT DOCUMENTS

| | | | |
|---|---|---|---|
| 5,773,964 A * | 6/1998 | Peter | 322/20 |
| 5,998,880 A | 12/1999 | Kumar | |
| 6,907,793 B2 * | 6/2005 | Reutlinger et al. | 73/862.28 |
| 7,417,333 B2 * | 8/2008 | Miller et al. | 290/44 |
| 2008/0291452 A1 | 11/2008 | Dam et al. | |

FOREIGN PATENT DOCUMENTS

| | | |
|---|---|---|
| DE | 195 23 302 | 1/1997 |
| DE | 197 55 050 | 7/1999 |
| DE | 100 40 112 | 2/2002 |
| DE | 10 2004 003 101 | 8/2004 |
| DE | 103 61 215 | 7/2005 |
| DE | 10 2004 025 241 | 12/2005 |
| DE | 10 2006 003 425 | 8/2006 |
| DE | 10 2005 012 052 | 10/2006 |
| DE | 10 2006 000 260 | 12/2006 |
| EP | 1 646 522 | 4/2006 |

OTHER PUBLICATIONS

International Search Report for PCT/EP2011/064230, dated Jan. 4, 2013.
Bosch, Volker: "Fachpraktikum Synchronmaschine", Feb. 1, 1998, p. 1-24.

* cited by examiner

*Primary Examiner* — Nicholas Ponomarenko
(74) *Attorney, Agent, or Firm* — Kenyon & Kenyon LLP

(57) ABSTRACT

A setpoint for a mechanical torque of a generator in a recuperation system of a motor vehicle is specified, and a generator current of the generator for setting the specified mechanical torque of the generator is set.

11 Claims, 4 Drawing Sheets

METHOD AND DEVICE FOR OPERATING A GENERATOR IN A RECUPERATION SYSTEM OF A MOTOR VEHICLE

BACKGROUND OF THE INVENTION

1. Field of the Invention

The present invention relates to the operation, in particular the control or regulation, of a generator in a recuperation system of a motor vehicle.

2. Description of the Related Art

In the interest of reducing $CO_2$ discharge, and in light of constantly rising fuel prices, recuperation systems for reducing the fuel consumption and thus the $CO_2$ emissions of motor vehicles are becoming increasingly significant.

The motor vehicle's electrical system has a considerable influence on fuel consumption and thus on the $CO_2$ emissions of the motor vehicle. An additional electrical power output of 100 W results, for example, in additional consumption of about 0.1 1/100 km in the New European Driving Cycle (NEDC). A 500 W vehicle electrical system load in this case signifies an additional 0.5 1/100 km of consumption.

If the kinetic energy released upon braking, or the potential energy released when traveling downhill, is used to power the vehicle's electrical system, the proportional fuel consumption, and thus $CO_2$ emission, can thereby be reduced. A further potential for reducing fuel consumption results when the electrical machine of the motor vehicle is also utilized in motor mode and can thus contribute to the drive torque of the vehicle (boost). The resulting shift in the operating point of the internal combustion engine of the motor vehicle allows additional fuel savings to be achieved.

In order to be able to utilize braking energy, a suitable generator is necessary together with a suitable energy reservoir such as, for example, a lithium ion battery or a double layer capacitor, as well as a suitable regulation strategy.

Conventional generators of the motor vehicle are voltage-regulated. This means that a target voltage is specified to the regulator or generator regulator, and is controlled by the generator regulator within a permissible tolerance range. FIG. 10 shows in this regard a schematic block diagram of a generator unit 1001. Generator unit 1001 has a generator 1003, a generator regulator 1005, and an evaluation apparatus 1007. Generator unit 1001 is coupled to electrical system 1009 of the motor vehicle.

Regulation of the excitation field by way of generator regulator 1005 allows the generator voltage to be held constant irrespective of the electrical system load, rotation speed, and temperature. The generator current, and thus generator torque, occurring at a target voltage depend here not only on the electrical system load but also on the state of the motor vehicle battery.

FIG. 11 furthermore shows a schematic block diagram of a recuperation system 1101. Recuperation system 1101 of FIG. 11 is, in particular, a recuperation-capable vehicle electrical system that is suitable, for example, for two voltage levels. A first voltage level is, for example, 14 volts, whereas a second voltage level is, for example 42 volts. Recuperation system 1101 of FIG. 11 has a generator 1103, a starter 1105, a load group 1107, and an electrical energy reservoir 1109. Recuperation system 1101 further has a DC/DC converter 1111 that is connected between the two voltage levels. Recuperation system 1101 furthermore has a motor 1113, a first load group 1115, a second load group 1117, and a battery 1119. The units 1103, 1105, 1107, and 1109 are operated at 42 volts. Units 1113, 1115, 1117, and 1119, conversely, are operated at 14 volts. DC/DC converter 1111 converts from 42 volts to 14 volts. The key components for recuperation in FIG. 11 are generator 1103, which can also be embodied as a starter/generator and thus operated in motor mode, and power battery 1109.

When a specific torque and thus a specific mechanical power output is requested from the generator at a specific rotation speed, however, the electrical power output and thus, in particular, the generator current must be correspondingly adjusted. If torque regulation is additionally necessary, continuous power output regulation is then necessary in the context of any change in rotation speed.

With a conventional voltage regulation system this is possible only with a certain complexity. On the one hand, the generator current that occurs at a specific generator voltage depends on the battery state. In other words, appreciably different generator currents can occur for the same voltage but for a different battery charge state and battery temperature.

On the other hand, tolerances in the context of voltage regulation due to the relatively low internal resistance of power battery 1109 can result in appreciably different generator currents. A small voltage shift, for example a slight offset in the voltage measurement, can consequently lead to an appreciable current excursion and thus an appreciable deviation in the generator's power output.

In order to reduce the aforementioned dependence of the generator current on the generator voltage, current regulation can be carried out by cascade regulation, in which current regulation is overlaid on voltage regulation. If the current regulating function does not run on the generator regulator, however, sufficiently fast and accurate current regulation requires a correspondingly fast voltage definition. This requires a correspondingly fast and fail-safe communication interface. In addition, the corresponding control unit that contains the current regulation function must know the generator current. This control unit must moreover furnish sufficient resources, such as computational performance reserve and bus load, for such regulation.

Published European patent document EP 1 646 522 B1 presents a motor vehicle electrical system having a multi-voltage generator/motor, which encompasses an electrical machine, a regulator, and a pulse width modulated inverter, for electrically powering a first electrical sub-system having at least one first load in which a first nominal voltage (42 V) is present, and a second electrical sub-system having at least one second load in which a second nominal voltage (14 V) is present, and having a control unit, the motor vehicle electrical system having a DC/DC converter downstream from the multi-voltage generator/motor.

Published German patent application document DE 197 55 050 A1 describes a device for supplying energy in a vehicle electrical system for at least two similar electrical loads, in particular electrically actuatable vehicle brakes that are connected to at least two voltage reservoirs chargeable by a generator, the vehicle electrical system being a multi-voltage electrical system having at least two different voltages, and a decoupling element being located between the voltage reservoirs.

BRIEF SUMMARY OF THE INVENTION

The present invention is based on the recognition of regulating the generator current, rather than conventional regulation of the generator voltage, in order to set a specific mechanical torque at the generator. With a recuperation system it is necessary to set the specific mechanical torque in order to decelerate the vehicle appropriately in accordance with the driver's input. One possibility for sensing the driver's input, and thus for ascertaining the specific mechanical torque, is to sense the brake pedal angle. When pressing the brake pedal the driver expects first of all a deceleration, i.e. a braking torque, and thus a specific speed-dependent braking power. If the generator is to be used for recuperation, the braking power is then applied to a specific degree by the generator. A specific mechanical power output is thus set at the generator.

A particular advantage of the proposed generator current regulation/control function is that the regulator or generator regulator can regulate autonomously and correspondingly quickly, in particular with no need for correspondingly fast communication and regulation to occur externally. Thanks to the utilization according to the present invention of the correlation between generator current, excitation current, generator voltage, and rotation speed, it is preferably possible to dispense with a current measurement. This yields cost advantages.

According to the present invention, in a motor vehicle having a recuperation function, fuel is saved and $CO_2$ emissions are thus decreased. A specification of torque, power output, or current for the generator can be used for the generator current regulation function according to the present invention. Disadvantages of conventional voltage regulation can thereby be avoided. The need to modify the setpoint specification upon changes in rotation speed can also be eliminated. This makes possible a relatively slow and thus resource-minimizing setpoint specification. The reference variable or setpoint specification of the generator can thus be specified at relatively long time intervals, for example several tens of ms, so that only a low resource demand is made on external control units, and a communication link using, for example, relatively slow (but economical) LIN buses remains possible.

A method for operating a generator in a recuperation system of a motor vehicle is therefore proposed, in which method a setpoint for a mechanical torque of the generator is specified, and a generator current of the generator for setting the specified mechanical torque of the generator is set.

An apparatus for operating a generator in a recuperation system of a motor vehicle is also proposed. The apparatus has a regulator that is set up to set a generator current in such a way that a specified mechanical torque sets in at the generator.

Also proposed is a recuperation system for a motor vehicle which has an apparatus as explained above for operating a generator.

A motor vehicle that has such a recuperation system is additionally proposed. For purposes of the present Application, a "motor vehicle" is a passenger car, a truck, or a commercial vehicle.

According to a preferred refinement, an actual value of the generator current is controlled or regulated to a setpoint of the generator current in order to set the specified mechanical torque of the generator. This control or regulation occurs preferably as a function of the present rotation speed of the generator.

According a preferred refinement, the setpoint of the generator current is specified by way of a setpoint specification for the generator current. For example, the setpoint specification is stored in a memory device of a control unit of the motor vehicle.

According to a preferred refinement, the setpoint of the generator current is set as a function of the actual value of the generator current, the setpoint specification for the generator current, and the rotation speed of the generator.

According to a preferred refinement, an actual value of the excitation current of the generator is controlled or regulated to a setpoint of the excitation current of the generator in order to adjust the actual value of the generator current to the specified setpoint of the generator current.

The setpoint of the excitation current is preferably set as a function of a setpoint specification for the generator current, a model for correlating generator current with excitation current, and the rotation speed of the generator.

According to a preferred refinement, the setpoint specification for the generator current is calculated as a function of a specified target electrical power output and the generator voltage. The setpoint specification for the generator current can be calculated, in particular, from the target electrical power output and the generator voltage.

According to a preferred refinement, the setpoint specification for the generator current is calculated as a function of a specified target mechanical power output and the generator voltage. In particular, the target electrical power output can be calculated from the target mechanical power output. The setpoint specification for the generator current can be calculated in turn from the calculated target electrical power output and the generator voltage.

According to a preferred refinement, the setpoint specification for the generator current is calculated as a function of a specified setpoint of the mechanical torque of the generator and the generator voltage. A target mechanical power output can be calculated from the specified setpoint of the mechanical torque of the generator. The target electrical power output can be derived in turn from the target mechanical power output. The setpoint specification for the generator current can be calculated from the derived target electrical power output and the generator voltage.

A method for controlling a generator in a recuperation system of a motor vehicle is also proposed. In this context, an upper and a lower voltage threshold value are specified in order to define a voltage range. If the present generator voltage is within the defined voltage range, the method explained above for operating a generator in a recuperation system is then carried out. In other words, within the defined voltage range, a generator current regulation function is carried out. If the present generator voltage is, however, at the limit of or outside the defined voltage range, a voltage regulation function is then carried out, in which context an actual value of the generator voltage is regulated to a setpoint of the generator voltage.

DETAILED DESCRIPTION OF THE INVENTION

Figure 1:
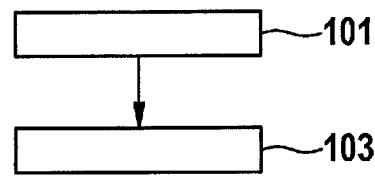
FIG. 1 is a schematic flow chart of an exemplifying embodiment of a method for operating a generator in a recuperation system of a motor vehicle.

FIG. 1 is a schematic flow chart of an exemplifying embodiment of a method for operating a generator in a recuperation system of a motor vehicle.

In step 101, a setpoint for a mechanical torque of the generator is specified.

In step 103, a generator current of the generator for setting the specified mechanical torque of the generator is set.

FIG. 1 thus shows one possible method for generator current regulation, in which an actual value of the generator current is regulated to a setpoint of the generator current in order to set the specified mechanical torque of the generator. This regulation can be carried out in particular as a function of the present rotation speed of the generator. For example, the setpoint of the generator current is specified by way of a setpoint specification for the generator current.

Figure 2:
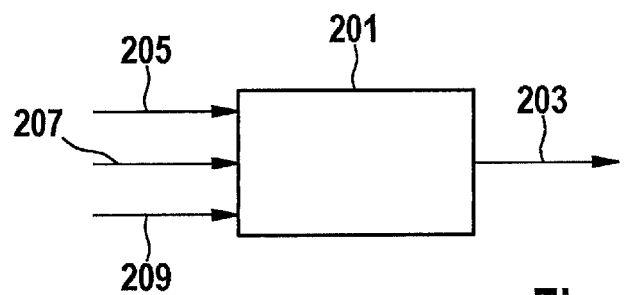
FIG. 2 is a schematic block diagram of a first exemplifying embodiment of an apparatus for operating a generator in a recuperation system of a motor vehicle.

FIG. 2 is a schematic block diagram of a first exemplifying embodiment of an apparatus 201 for operating a generator in a recuperation system. Apparatus 201 is embodied, for example, as a regulator. Regulator 201 regulates setpoint 203 of the generator current as a function of actual value 205 of the generator current, setpoint specification 207 for the generator current, and rotation speed 209 of the generator current.

Figure 3:
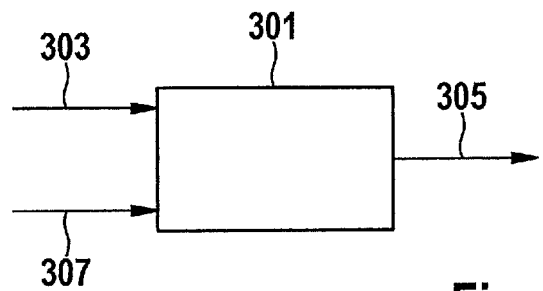
FIG. 3 is a schematic block diagram of a second exemplifying embodiment of an apparatus for operating a generator in a recuperation system of a motor vehicle.

FIG. 3 depicts a second exemplifying embodiment of a regulator. Regulator 301 of FIG. 3 controls or regulates an actual value 303 of the excitation current of the generator to a setpoint 305 of the excitation current of the generator in order to adjust an actual value of the generator current to the specified setpoint of the generator current. For this regulator 301 also receives, in addition to actual value 303 of the excitation current of the generator, a setpoint specification 307 for the excitation current.

Figure 4:
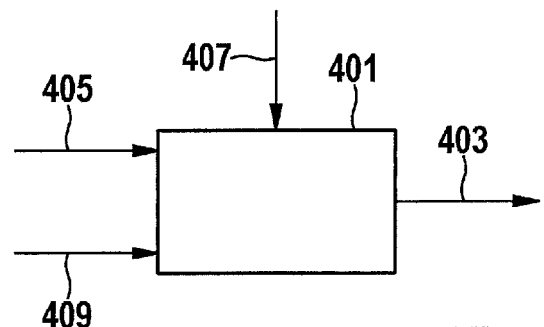
FIG. 4 is a schematic block diagram of a third exemplifying embodiment of an apparatus for operating a generator in a recuperation system of a motor vehicle.
Figure 5:
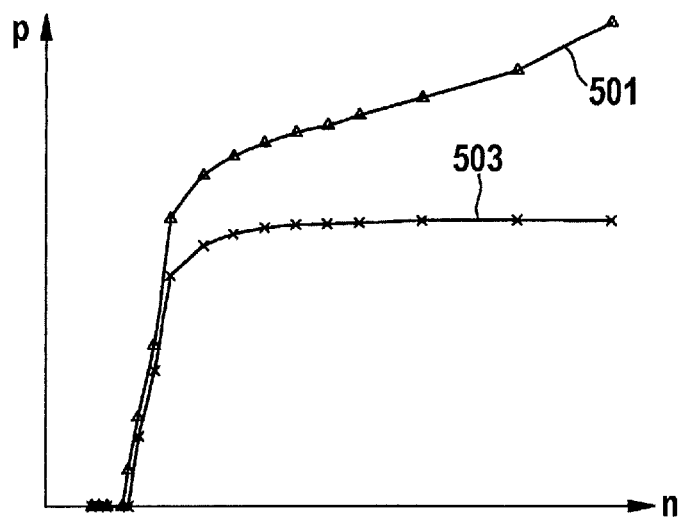
FIG. 5 is a diagram to illustration the mechanical and electrical generator power output at full load as a function of rotation speed.

FIG. 4 depicts a third exemplifying embodiment of such a regulator. Regulator 401 of FIG. 4 sets setpoint 403 of the excitation current as a function of a setpoint specification 405 for the generator current, a model 407 for correlation of generator current with excitation current, and rotation speed 409 of the generator. The model for correlating generator current with excitation current is embodied, for example, as a characteristics diagram. FIG. 5 shows in this connection a diagram to illustrate the mechanical and electrical generator power output at full load as a function of rotation speed. In FIG. 5, the X axis shows the generator rotation speed n and the Y axis shows the generator power output P. The mechanical generator power output is depicted by curve 501. Curve 503 shows the electrical generator power output at full load as a function of rotation speed n.

Figure 6:
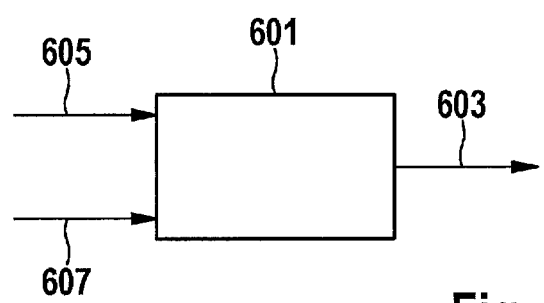
FIG. 6 is a schematic block diagram of a fourth exemplifying embodiment of an apparatus for operating a generator in a recuperation system of a motor vehicle.

FIG. 6 depicts a schematic block diagram of a fourth exemplifying embodiment of a regulator for operating a generator in a recuperation system. Regulator 601 of FIG. 6 controls or regulates generator current 603 as a function of an internally calculated setpoint specification for the generator current. The setpoint specification for the generator current is calculated by controller 601 as a function of a specified target electrical power output 605 and generator voltage 607.

Figure 7:
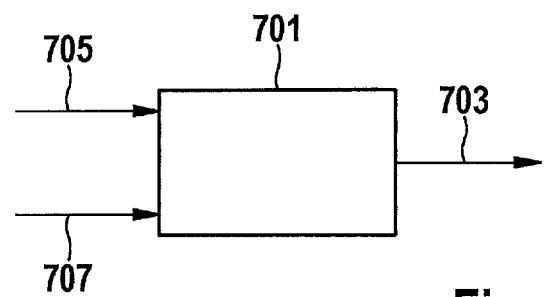
FIG. 7 is a schematic block diagram of a fifth exemplifying embodiment of an apparatus for operating a generator in a recuperation system of a motor vehicle.

FIG. 7 shows a fifth exemplifying embodiment of such a regulator. Regulator 701 of FIG. 7 controls or regulates generator current 703 as a function of an internally calculated setpoint specification for the generator current. The setpoint specification for the generator current is calculated by regulator 701 as a function of a specified target mechanical power output 705 and generator voltage 707. The target electrical power output can be calculated in particular from target mechanical power output 705. From the calculated target electrical power output and the generator voltage it is possible in turn to calculate the setpoint specification for the generator current, from which in turn the setpoint specification for the excitation current can be calculated.

Figure 8:
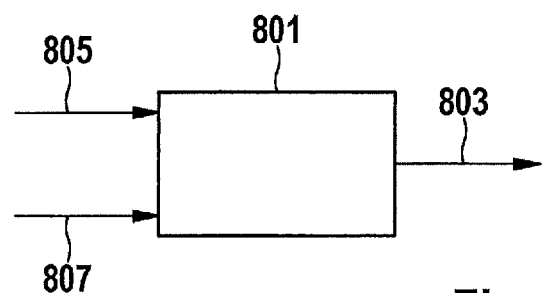
FIG. 8 is a schematic block diagram of a sixth exemplifying embodiment of an apparatus for operating a generator in a recuperation system of a motor vehicle.

A sixth exemplifying embodiment of such a regulator is depicted in FIG. 8. Regulator 801 of FIG. 8 controls or regulates the generator current as a function of an internally calculated setpoint specification for the generator current. In order to calculate the setpoint specification for the generator current, regulator 801 receives a specified setpoint 805 of the mechanical torque of the generator, and generator voltage 807. The target mechanical power output can be calculated from the specified setpoint 805 of the mechanical torque of the generator. The target electrical power output can be calculated in turn from the target mechanical power output. From the calculated target electrical power output and generator voltage 807, regulator 801 calculates the setpoint specification for the generator current.

Figure 9:
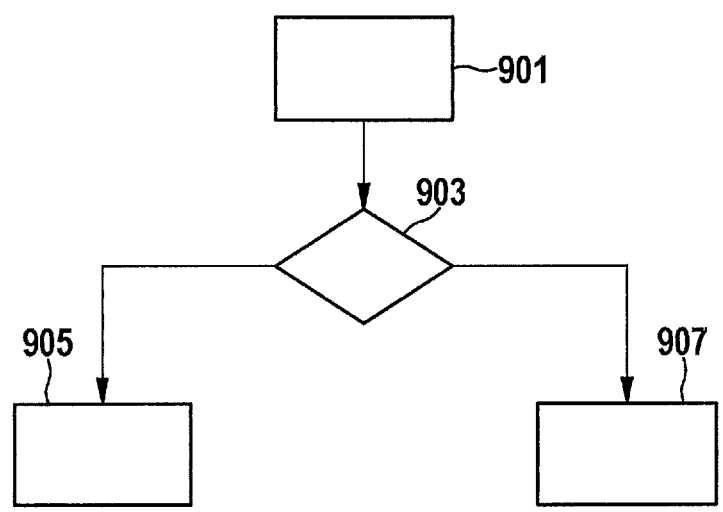
FIG. 9 is a schematic flow chart of an exemplifying embodiment of a method for regulating a generator in a recuperation system of a motor vehicle.
Figure 10:
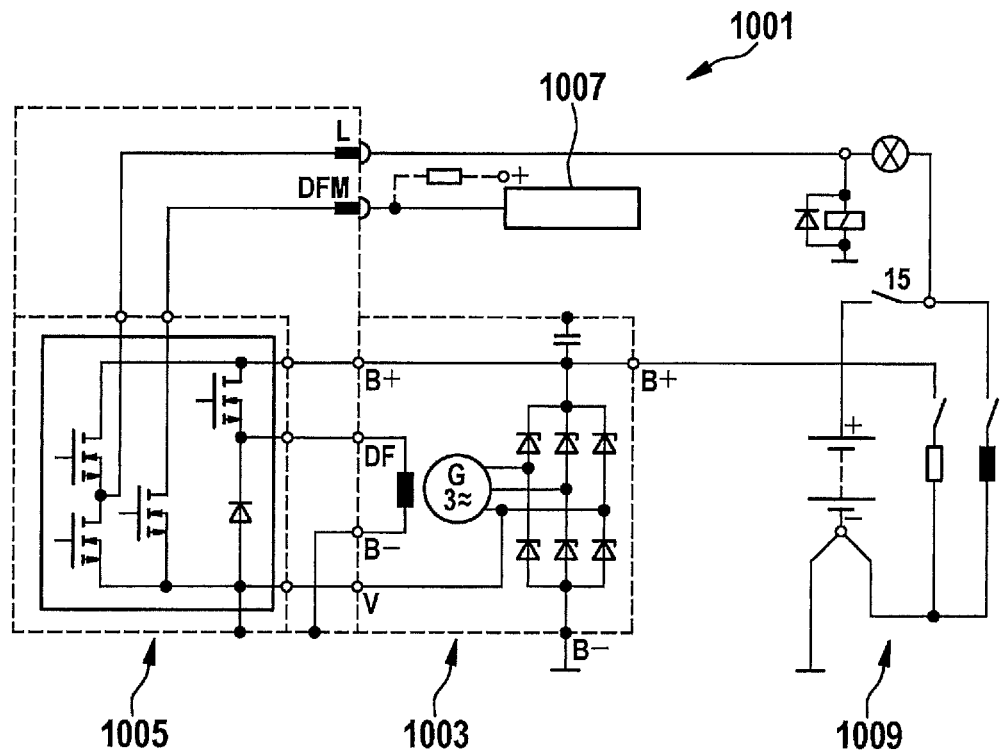
FIG. 10 is a schematic block diagram of a generator unit.
Figure 11:
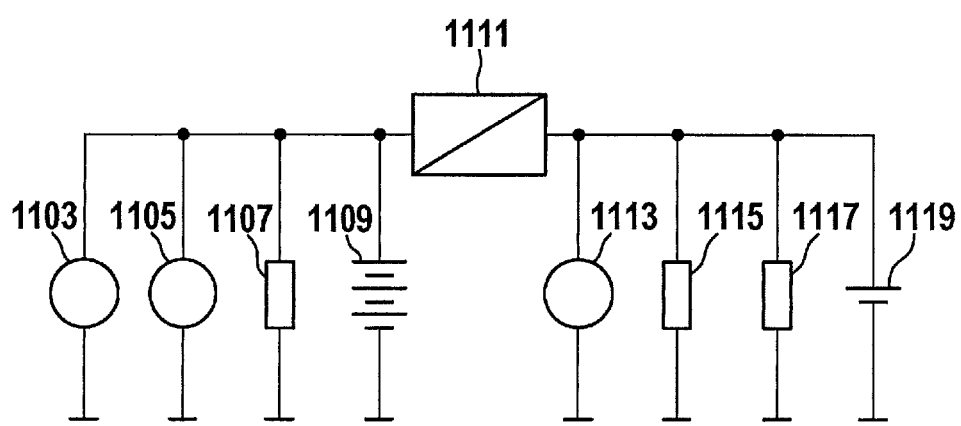
FIG. 11 is a schematic block diagram of a recuperation system.

FIG. 9 is a schematic flow chart of an exemplifying embodiment of a method for controlling a generator in a recuperation system of a motor vehicle.

In step 901, an upper and a lower voltage threshold value for defining a voltage range are specified.

Step 903 checks whether the present generator voltage is within the defined voltage range.

If the present generator voltage is within the defined-voltage range, method step 905 is carried out. Method step 905 contains a first sub-step and a second sub-step. In the first sub-step, a setpoint for a mechanical torque of the generator is specified. In the second sub-step, the generator current of the generator is adjusted in order to set a specified mechanical torque of the generator. Step 905 thus encompasses a generator current regulation function.

If the present generator voltage is at the limit of or outside the defined voltage range, however, then in accordance with step 907 a voltage regulation function is carried out. In this, an actual value of the generator voltage is controlled or regulated to a setpoint of the generator voltage that can be, for example, one of the voltage limits themselves. The generator voltage is consequently held at the voltage limit if the requested current would result in too high or too low a voltage.

What is claimed is:

1. A method for operating a generator in a recuperation system of a motor vehicle, comprising:
    setting a setpoint value for a mechanical torque of the generator;
    setting a setpoint value for a generator current of the generator; and
    controlling an actual value of the generator current to the setpoint value of the generator current in order to achieve a mechanical torque of the generator corresponding to the setpoint value of the mechanical torque.

2. The method as recited in claim 1, wherein the actual value of the generator current is controlled to the setpoint value of the generator current, as a function of a present rotation speed of the generator.

3. The method as recited in claim 2, wherein the setpoint value of the generator current is set as a function of the actual value of the generator current, a setpoint specification for the generator current, and the rotation speed of the generator.

4. The method as recited in claim 2, wherein an actual value of an excitation current of the generator is controlled to a setpoint of the excitation current of the generator in order to adjust the actual value of the generator current to the setpoint value of the generator current.

5. The method as recited in claim 4, wherein the setpoint of the excitation current is set as a function of a setpoint specification for the generator current, a model for correlating generator current with excitation current, and the rotation speed of the generator.

6. The method as recited in claim 5, wherein the setpoint specification for the generator current is calculated as a function of a specified target electrical power output and the generator voltage.

7. The method as recited in claim 5, wherein the setpoint specification for the generator current is calculated as a function of a specified target mechanical power output and the generator voltage.

8. The method as recited in claim 5, wherein the setpoint specification for the generator current is calculated as a function of a specified setpoint of the mechanical torque of the generator and the generator voltage.

9. A method for controlling a generator in a recuperation system of a motor vehicle, comprising:
specifying an upper voltage threshold value and a lower voltage threshold value defining a voltage range;
performing, within the defined voltage range, the following:
setting a setpoint value for a mechanical torque of the generator;
setting a setpoint value for a generator current of the generator; and
controlling an actual value of the generator current to the setpoint value of the generator current in order to achieve a mechanical torque of the generator corresponding to the setpoint value of the mechanical torque; and
controlling, outside the defined voltage range, an actual value of the generator voltage to a setpoint value of the generator voltage.

10. A method for controlling a generator in a recuperation system of a motor vehicle, comprising:
specifying an upper voltage threshold value and a lower voltage threshold value defining a voltage range;
determining whether the present generator voltage is within the defined voltage range;
if the present generator voltage is within the defined voltage range, performing the following:
setting a setpoint value for a mechanical torque of the generator;
setting a setpoint value for a generator current of the generator; and
controlling an actual value of the generator current to the setpoint value of the generator current in order to achieve a mechanical torque of the generator corresponding to the setpoint value of the mechanical torque; and
if the present generator voltage is outside the defined voltage range, controlling an actual value of the generator voltage to a setpoint value of the generator voltage.

11. A control unit for operating a generator in a recuperation system of a motor vehicle, comprising:
means for setting a setpoint value for a mechanical torque of the generator;
means for setting a setpoint value for a generator current of the generator; and
means for controlling an actual value of the generator current to the setpoint value of the generator current in order to achieve a mechanical torque of the generator corresponding to the setpoint value of the mechanical torque.

* * * * *